United States Patent [19]

Vetter

[11] Patent Number: 4,504,884
[45] Date of Patent: Mar. 12, 1985

[54] ELECTRIC ROLL-TYPE CAPACITOR WITH CONTACTS AT THE END FACE THEREOF AND METHOD FOR MANUFACTURING THE SAME

[75] Inventor: Harald Vetter, Regensburg, Fed. Rep. of Germany

[73] Assignee: Siemens Aktiengesellschaft, Berlin and Munich, Fed. Rep. of Germany

[21] Appl. No.: 508,587

[22] Filed: Jun. 28, 1983

[30] Foreign Application Priority Data

Jun. 29, 1982 [DE] Fed. Rep. of Germany ....... 3224194

[51] Int. Cl.³ .......................... H01G 4/08; H01G 1/14; H01G 4/06
[52] U.S. Cl. .................................. 361/323; 29/25.42; 361/304; 361/309
[58] Field of Search ............... 29/25.42; 361/303–315, 361/323

[56] References Cited

U.S. PATENT DOCUMENTS

| 2,797,373 | 6/1957 | Peck | 361/307 |
| 3,364,401 | 1/1968 | Rayburn | 29/25.42 X |
| 3,457,478 | 7/1969 | Lehrer | 361/323 X |
| 3,539,885 | 11/1970 | England | 361/308 |
| 4,037,298 | 7/1977 | Flanagan et al. | 29/25.42 |
| 4,102,021 | 7/1978 | Nakao et al. | 29/25.42 |
| 4,142,222 | 2/1979 | Kotschy et al. | 361/304 X |

Primary Examiner—Donald A. Griffin
Attorney, Agent, or Firm—Herbert L. Lerner; Laurence A. Greenberg

[57] ABSTRACT

An electric roll-type capacitor with contacts at the ends thereof, includes a dielectric formed of plastic foils wound together with a mutual offset, and an electrode in the form of regenerable thin metal layers disposed on part of at least one of the plastic foils defining an edge of the at least one plastic foil free of the metal layers, the metal free edge of the at least one plastic foil having a cut formed therein, and the offset being at most 0.2 mm wide, and a method for manufacturing the same.

12 Claims, 4 Drawing Figures

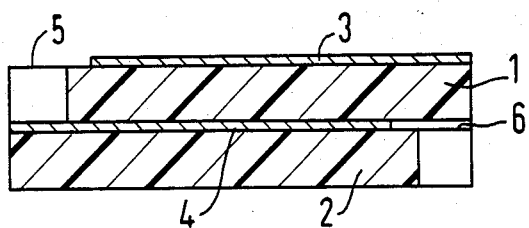
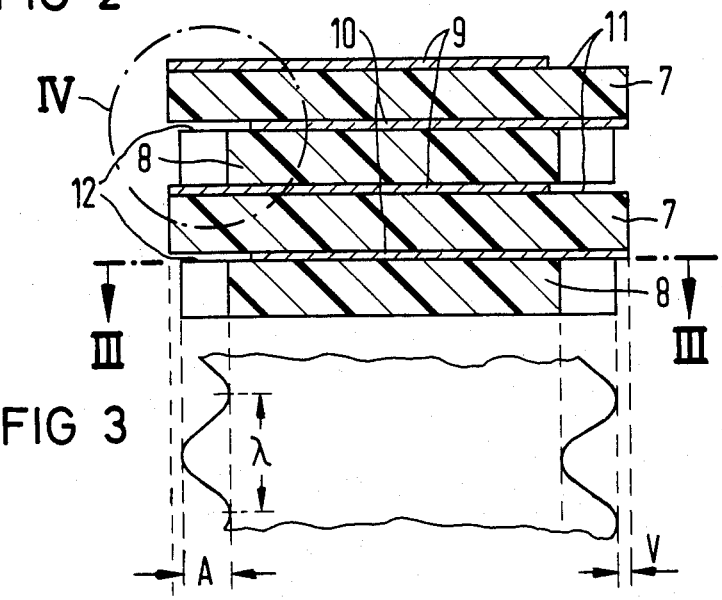
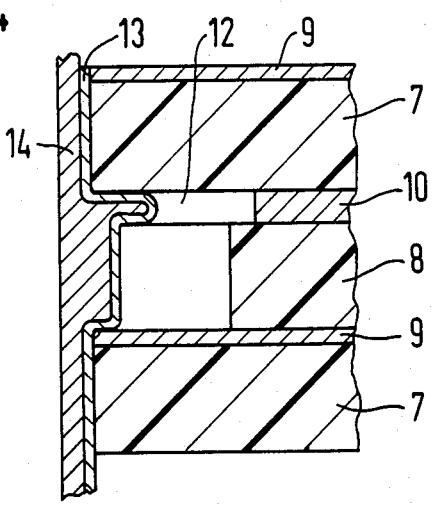

ELECTRIC ROLL-TYPE CAPACITOR WITH CONTACTS AT THE END FACE THEREOF AND METHOD FOR MANUFACTURING THE SAME

The invention relates to a roll-type or wound electric capacitor with contacts at the end face thereof, a dielectric formed of plastic foils wound with an offset, and regenerable thin metal layers serving as an electrode disposed on at least one of the plastic foils with a metal-free edge, as well as a method for manufacturing the same.

Such full-plastic windings are contacted by means of the well known Schoop process, in which, for instance, aluminum-white metal or zinc is applied to the end faces of the winding by means of flame spraying. In order to assure the necessary electrical contact between the end face metal layer and the regenerable thin electrodes, it is necessary to wind the individual plastic foils with an offset of, for instance, 1 mm.

The form stability of the wound plastic foils is of interest in connection with the above-described winding offset. This form stability is, among other things, a function of the radius of curvature, i.e. of the radius of the winding in the case of a wound capacitor. With increasing winding diameter, the foil has less form stability, which means that it is deformed more and more, for constant foil tension. As a result, the foil becomes constricted at the margins with the winding offset and therefore, of necessity, pushes on the preceding layer.

In principle, this effect is found in all known capacitors and can be calculated with sufficient accuracy if a foil element of the wound capacitor is considered as a curved shell strip. The form stability, and therefore the deflection f of a material used is proportional to the modulus of elasticity E. If the form stability of paper P, for instance, is compared with that of polypropylene PP with the other parameters constant, we have $f_P/f_{PP} \sim E_{PP}/E_P$.

At room temperature, $f_P/f_{PP}$ is approximately $\frac{1}{4}$, so that in a paper-wound capacitor the above-mentioned constriction effect does not occur.

In this connection, the thermal stress of the edge zones of the foil is also not negligible in the Schoop process. With increasing temperature, the modulus of elasticity of plastic foils decreases steeply, whereas the modulus of elasticity of paper is hardly changed in the range of the Schoop temperatures. The ratio $f_P/f_{PP}$ therefore becomes more and more unfavorable for polypropylene with increasing temperatures, i.e. the deformation increases still further.

The afore-described constriction of the edge zone of the foil produces heavy mechanical elongation in the transverse direction of the foil along with the danger of damaging the metal film coating disposed on the foils, in addition to the Schoop stress.

It is accordingly an object of the invention to provide an electric roll-type or wound capacitor, which overcomes the hereinafore-mentioned disadvantages of the heretofore-known devices and methods of this general type, in which the above-described constriction effects in the edge zones of the foils do not occur and which can nevertheless be contacted well by means of the Schoop process.

With foregoing and other objects in view there is provided, in accordance with the invention, an electric roll-type capacitor with contacts at the ends thereof, comprising a dielectric formed of plastic foils wound together with a mutual offset, and an electrode in the form of regenerable thin metal layers disposed on part of at least one of the plastic foils defining an edge of the at least one plastic foil free of the metal layers, the metal free edge of the at least one plastic foil having a wave or step cut formed therein with a given amplitude A and wave length λ, and the offset being between 0 and 0.2 mm.

In accordance with another feature of the invention, the plastic foils are in the form of two plastic foils, the metal electrode layers are in the form of two metal layers each being disposed on a respective one of the plastic foils, and the plastic foils are wound together in such a manner that the metal free edges are disposed on different sides of the capacitor.

In accordance with a further feature of the invention, the plastic foils are in the form of two plastic foils, the metal electrode layers are in the form of two metal layers both being disposed on one of the two plastic foils, the other of the two plastic foils is a support foil wound together with the one support foil and uncoated by a metal layer, and the metal free edges are disposed on different edges of the one plastic foil.

In accordance with an added feature of the invention, at least one of the plastic foils is formed of a material from the group consisting of polypropylene and polycarbonate.

In accordabce with an additional feature of the invention, the wave or step cut has an amplitude of substantially between 0.5 and 2 mm and a wave length of substantially between 1 and 5 mm.

In accordance with again another feature of the invention, the foils are formed of the same material.

There is also provided a method for manufacturing the roll-type or wound capacitor, which comprises pre-seeding end surfaces of the capacitor or winding by sputtering with at least one layer, and subsequently applying end surface contact layers on the at least one sputtered layer by flame spraying (Schoop method).

In accordance with a concomitant mode of the invention, there is provided a method which comprises removing an oxide layer disposed on the metal layers in vicinity of the end surfaces by sputtering or reverse sputtering, ion-beam etching or plasma etching, prior to the pre-seeding step.

Other features which are considered as characteristic for the invention are set forth in the appended claims.

Although the invention is illustrated and described herein as embodied in an electric roll-type capacitor with contacts at the end face thereof and method for manufacturing the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a diagrammatic, cross-sectional view of a capacitor structure without a support foil;

FIG. 2 is a cross-sectional view of a capacitor structure with a support foil;

FIG. 3 is a plan view of the support foil; and

FIG. 4 is an enlarged, detailed, fragmentary view of an edge region according to FIG. 2.

Referring now the figures of the drawing in detail, and first particularly to FIG. 1 thereof, there is seen a capacitor structure in which two plastic foils 1, 2 are wound together. Disposed on each of the plastic foils 1, 2, which are formed, for instance, of polypropylene or polycarbonate, is a regenerable thin metal layer 3 or 4, respectively, which may be made of aluminum, for example. Metal-free edge zones 5 and 6 are futhermore provided at different longitudinal sides of the foils 1 and 2. The edges of the plastic foils 1 and 2 are respectively provided in vicinity of the free edge zones 5 and 6 with a wave or step cut of amplitude A and wave length λ, as indicated in FIG. 3. The foils 1 and 2 are wound together with a mutual staggering or offset of from 0 to 0.2 mm.

By providing the wave or step cut according to the invention in vicinity of the free edge zones, a substantial increase of the form stability of the winding is obtained without this resulting in a degradation of the contacting.

If the already described foil element in the endangered edge region of the winding is considered and if the width is decreased until the form stability due to curvature can be ignored, the deflection under a uniformly distributed load can readily be determined. A foil element with the same dimensions, partially supported by the plastic foil with the wave cut, can be treated under the same load conditions as a shell element which is clamped on one side and supported on both sides. This results in approximately the following stiffness ratio:

$$w \sim 1/60 \cdot f \cdot l,$$

where f is the deflection or curvature of the bent beam;
w is the deflection of the shell element; and
l is the clamped length which corresponds to the emplitude A of the wave cut.

With the present dimensions, $f \sim 1.4$ mm and $l \sim 1$ mm, a stiffening of the edge zone of the foil increased by a factor of approximately 40 is therefore obtained.

FIG. 2 shows a winding structure, in which regenerable thin metal films 9 and 10 are respectively disposed on the top and bottom surfaces of plastic foils 7. Each plastic foil 7 is wound together with a plastic support foil 8 which has no metal layers. In vicinity of free edge zones 11 and 12 of the plastic foil 7, the support foil 8 is provided at both edges with a wave or step cut. The foils 7 and 8 are wound together with an offset or stagger v which is maximally 0.2 mm, in the embodiment example shown in FIG. 2.

In FIG. 3, a view of the support foil 8 is shown. It can be seen there that in the edge regions of the support foil, a wave cut with the amplitude A and the wave length λ is disposed. The amplitude A is approximately from 0.5 to about 2 mm and is preferably smaller than the free edge regions. The wave length λ is, for instance, approximately 1 to 5 mm.

FIG. 4 shows an enlarged, detailed view of the edge region of the capacitor structure shown in FIG. 2. The end faces of the winding formed of the plastic foil 7 and the plastic foil 8 is pre-seeded or seeded in advance with a layer 13 formed of one or more layers made by sputtering. A Schoop or flame sprayed layer 14 is disposed on the layer 13. With this construction an even more secure contact with the metal layers 9 and 10 is assured, since in the Schoop process, contact is only made pointwise, while a large-area contact is obtained with cathode sputtering.

In addition it is possible, through reverse sputtering (etching by sputtering) or through iob-beam or plasma etching, to remove an oxide layer which may be present on the metal layers 9 or 10 (the thickness of the air oxide layer is approximately 4 nm). Subsequently, an oxide-free contact coating can be applied thereto.

The foregoing is a description corresponding in substance to German Application No. P 32 24 194.1, dated June 29, 1982, the International priority of which is being claimed for the instant application, and which is hereby made part of this application. Any discrepancies between the foregoing specification and the aforementioned corresponding German application are to be resolved in favor of the latter.

I claim:

1. Electric roll-type capacitor with contacts at the ends thereof, comprising a dielectric formed of plastic foils with upper surfaces wound together with a mutual offset, and an electrode wound with said foils in the form of regenerable thin metal layers disposed on part of at least one of said plastic foils defining an edge of said at least one plastic foil free of said metal layers, said metal free edge of said at least one plastic foil having a step-shaped cut formed therein defining a first step surface substantially parallel to said upper surfaces of said plastic foils and a second step surface substantially perpendicular to said upper surfaces of said plastic foils extended from said first step surface to said upper surfaces of said plastic foils, and said offset being at most 0.2 mm wide.

2. Electric roll-type capacitor according to claim 1, wherein said plastic foils are in the form of two plastic foils, said metal layers are in the form of two metal layers each being disposed on a respective one of said plastic foils, and said metal free edges and step-shaped cuts are disposed on different sides of the capacitor.

3. Electric roll-type capacitor according to claim 2, wherein at least one of said plastic foils is formed of a material from the group consisting of polypropylene and polycarbonate.

4. Electric roll-type capacitor according to claim 1, wherein said plastic foils are in the form of two plastic foils, said metal layers are in the form of two metal layers both being disposed on one of said two plastic foils, the other of said two plastic foils is a support foil uncoated by metal, and said metal free edges and step-shaped cuts are disposed on two different edges of said one plastic foil.

5. Electric roll-type capacitor according to claim 4, wherein at least one of said plastic foils is formed of a material from the group consisting of polypropylene and polycarbonate.

6. Electric roll-type capacitor according to claim 4, wherein said foils are formed of the same material.

7. Electric roll-type capacitor according to claim 1, wherein at least one of said plastic foils is formed of a material from the group consisting of polypropylene and polycarbonate.

8. Electric roll-type capacitor according to claim 1, wherein said cut has an amplitude of substantially between 0.5 and 2 mm and a wave length of substantially between 1 and 5 mm.

9. Method of manufacturing an electric roll-type capacitor with contacts at the end thereof, which comprises forming a dielectric by winding together plastic foils having upper surfaces with a mutual offset being at most 0.2 mm wide, winding an electrode in the form of regenerable thin metal layers on part of at least one of the plastic foils defining an edge of the at least one plastic foil free of the metal layers, forming a step-shaped cut in the metal free edge of the at least one plastic foil defining a first step surface substantially parallel to said upper surfaces of said plastic foils and a second step surface substantially perpendicular to said upper surfaces of said plastic foils extended from said first step surface to said upper surfaces of said plastic foils, pre-seeding end surfaces of the capacitor by sputtering with at least one layer, and subsequently applying end surface contact layers on the at least one sputtered layer by flame spraying.

10. Method according to claim 9, which comprises removing an oxide layer disposed on the metal layers in vicinity of the end surfaces by sputtering, prior to the pre-seeding step.

11. Method according to claim 9, which comprises removing an oxide layer disposed on the metal layers in vicinity of the end surfaces by ion-beam etching, prior to the pre-seeding step.

12. Method according to claim 9, which comprises removing an oxide layer disposed on the metal layers in vicinity of the end surfaces by plasma etching, prior to the pre-seeding step.

* * * * *